(12) United States Patent
Feng et al.

(10) Patent No.: US 12,390,877 B1
(45) Date of Patent: Aug. 19, 2025

(54) METHOD, DEVICE, APPARATUS AND STORAGE MEDIA FOR WELDING QUALITY DETECTION

(71) Applicant: Tianjin Sunke Digital control technology Co. Ltd., Tianjin (CN)

(72) Inventors: Eugene Feng, Tianjin (CN); Yongzhi Zhang, Tianjin (CN); Lanmin Nie, Tianjin (CN)

(73) Assignee: Tianjin Sunke Digital Control Technology Co. Ltd, Tianjin (CN)

( * ) Notice: Subject to any disclaimer, the term of this patent is extended or adjusted under 35 U.S.C. 154(b) by 0 days.

(21) Appl. No.: 18/952,281

(22) Filed: Nov. 19, 2024

(30) Foreign Application Priority Data

Aug. 14, 2024 (CN) .......................... 202411121021.9

(51) Int. Cl.
*B23K 11/25* (2006.01)
*B23K 31/12* (2006.01)

(52) U.S. Cl.
CPC .......... *B23K 11/257* (2013.01); *B23K 11/258* (2013.01); *B23K 31/125* (2013.01)

(58) Field of Classification Search
None
See application file for complete search history.

(56) References Cited

U.S. PATENT DOCUMENTS

| | | | | |
|---|---|---|---|---|
| 3,746,829 A | * | 7/1973 | Petzold | B23K 11/256 219/110 |
| 4,024,371 A | * | 5/1977 | Drake | B23K 11/252 219/110 |
| 4,447,698 A | * | 5/1984 | Van Sikle | B23K 11/252 219/110 |

(Continued)

FOREIGN PATENT DOCUMENTS

| | | |
|---|---|---|
| CN | 108188560 A | 6/2018 |
| CN | 111390367 A | 7/2020 |

(Continued)

OTHER PUBLICATIONS

Machine translation of JP-2024023130-A, Jan. 2025 (Year: 2025).*
Machine translation of KR-20160142455-A, Jan. 2025 (Year: 2025).*
Machine translation of CN-116638218-A, Jan. 2025 (Year: 2025).*
Machine translation of JP-2014057979-A, Jan. 2025 (Year: 2025).*
Machine translation of CN-111693573-A, Jan. 2025 (Year: 2025).*
Machine translation of Cn-212843719-U, Jan. 2025 (Year: 2025).*
Machine translation of JP-06114569-A, Jan. 2025 (Year: 2025).*

(Continued)

*Primary Examiner* — Geoffrey S Evans

(74) *Attorney, Agent, or Firm* — Sisson & Banyas, Attorneys at Law, LLC; Edwin A. Sisson; Jeffrey J. Banyas

(57) ABSTRACT

The present application provides a method for weld quality detection comprising: applying a detection voltage to a weld during a cooling phase after the cut-off of the metal material welding current; detecting a detection current corresponding to the detection voltage applied to the weld; calculating continuous values of resistance of the weld during the cooling phase based on the detection voltage and the detection current; and determining whether a welding defect exists at the weld based on an initial value, an intermediate value, and an end value of the resistance. By measuring and analyzing the resistance variation in the melting core cooling phase and using the relationship between the resistivity of metal material and temperature to indirectly characterize the heat stored in weld nugget, the detection and evaluation of the quality of resistance spot welding can be realized.

7 Claims, 2 Drawing Sheets

(56) References Cited

U.S. PATENT DOCUMENTS

| | | | | |
|---|---|---|---|---|
| 4,456,810 A | * | 6/1984 | Schumacher | B23K 11/166 |
| | | | | 219/110 |
| 4,477,709 A | * | 10/1984 | Cleveland | B23K 11/256 |
| | | | | 219/109 |
| 6,140,825 A | * | 10/2000 | Fujii | B23K 31/125 |
| | | | | 219/110 |
| 6,288,364 B1 | * | 9/2001 | Simpson | B23K 9/0953 |
| | | | | 219/130.01 |
| 2004/0099648 A1 | * | 5/2004 | Hu | B23K 31/12 |
| | | | | 219/130.01 |

FOREIGN PATENT DOCUMENTS

| | | | | | |
|---|---|---|---|---|---|
| CN | 111693573 A | * | 9/2020 | | G01N 27/02 |
| CN | 212843719 U | * | 3/2021 | | |
| CN | 115392132 A | | 11/2022 | | |
| CN | 116638218 A | * | 8/2023 | | |
| CN | 116984721 A | | 11/2023 | | |
| JP | 50112243 A | | 9/1975 | | |
| JP | 06114569 A | * | 4/1994 | | |
| JP | 07266059 A | | 10/1995 | | |
| JP | 2002028790 A | | 1/2002 | | |
| JP | 2010234424 A | | 10/2010 | | |
| JP | 2014057979 A | * | 4/2014 | | |
| JP | 2020131270 A | | 8/2020 | | |
| JP | 2024023130 A | * | 2/2024 | | |
| KR | 20160142455 A | * | 12/2016 | | |
| KR | 20240038226 A | | 3/2024 | | |

OTHER PUBLICATIONS

Jing Wen, Chunsbeng Wang, Guocheng Xu, Guoli Cheng, Analysis on Dynamic Resistance in Resistance Spot Welding of Stainless Steel, Transactions of the China Welding Institution, Nov. 1, 2008, pp. 69-72, vol. 29, No. 11, ResearchGate.

* cited by examiner

METHOD, DEVICE, APPARATUS AND STORAGE MEDIA FOR WELDING QUALITY DETECTION

PRIORITIES AND CROSS REFERENCES

This Application claims priority from Chinese Application No. 202411121021.9 filed on 14 Aug. 2024, the teachings of which are incorporated by reference herein in their entirety.

FIELD

The present application relates to the field of welding quality detection, and particularly relates to a method, device, apparatus and storage medium for welding quality detection.

BACKGROUND

Resistance welding, including spot, seam, projection and butt welding, is an efficient, filler metal-free welding method. Resistance spot welders apply electrical voltage on electrodes to create necessary high current through the workpieces, causing the interface of the workpiece melts to form a weld nugget. After the weld nugget is cooled, the welding process is completed. It is an efficient, low cost, and high-speed metal joining method.

However, although resistance spot welding is a widely used technology, it is difficult to detect quality of the weld because the joining area is hidden, rendering it impossible to conduct visual inspection.

In actual production, electrode wear, assembly gap, workpiece surface contamination and other factors will affect the stability of the welding process, resulting in fluctuations in the size of the weld nugget, which in turn produces insufficient weld joint, spatter and other quality defects.

Two types of inspection are used today: destructive and non-destructive. Destructive type inspection methods, like manual chisel, metallographic analysis, etc., have drawbacks of high cost, low efficiency, and hard to implement online. Non-destructive inspection methods, such as ultrasonic testing, infrared testing etc., are better than the destructive inspection in that the work pieces are kept intact, which can save material cost. However, these methods such as infra-red and ultrasonic inspection have the drawbacks of high cost, low efficiency, and requiring specialized inspectors to operate which results in low degree of automation. None of the above-mentioned methods can meet the requirement of a complete inspection.

SUMMARY

The application is to overcome the above-mentioned problems of low detection efficiency, high cost, and inability to meet requirement of complete detection in the prior art, and to provide a method, device, apparatus, and storage medium for non-destructive welding quality detection.

The present application provides a method for weld quality detection applied to a welding device, wherein an operation process of the welding device includes a welding phase and a cooling phase after cutting off the welding current, the method including: applying a detection voltage to a weld for a period from the cut-off of the welding current till the temperature of the weld reaches a predetermined threshold; obtaining a detection current generated by the detection voltage applied to the weld; calculating a resistance of the weld continuously varying during the cooling phase based on the detection voltage and the detection current; and determining whether a welding defect exists at the weld based on the trend of the variation of the resistance or on the comparison of the resistance with a resistance of the qualified weld.

Optionally, determining whether a welding defect exists at the weld based on the trend of the variation of the resistance or on the comparison of the resistance with a resistance of the qualified weld current may include:
  generating a first resistance curve based on the continuously varying resistances;
  obtaining a second resistance curve generated based on the continuously varying resistance of the qualified weld at the cooling stage; and
  comparing the first resistance curve with the second resistance curve to determine if there is a weld defect.

Optionally, determining whether a welding defect exists at the weld based on the trend of the variation of the resistance or on the comparison of the resistance with a resistance of the qualified weld current may include:
  determining an insufficient weld joint if, among the continuously varying resistances, the initial value is smaller than the initial value at the qualified weld, the rate of decline of the intermediate value is smaller than the rate of decline of the intermediate value at the qualified weld, the end value is larger than the end value at the qualified weld, and the difference between the initial value and the end value is smaller than a first threshold.

Optionally, determining whether a welding defect exists at the weld based on the trend of the variation of the resistance or on the comparison of the resistance with a resistance of the qualified weld current may include:
  determining there is a spatter if, among the continuously varying resistances, the difference between the initial value of the resistance at a weld and the initial value at the qualified weld is less than the second threshold, the rate of decrease of the intermediate value of the resistance at the weld is greater than the rate of decrease of the intermediate value at the qualified weld, the end value of the resistance at the weld is less than the end value at the qualified weld, and the difference between the initial value and the end value of the resistance at the weld is less than a third threshold.

Optionally, determining whether a welding defect exists at the weld based on the trend of the variation of the resistance or on the comparison of the resistance with a resistance of the qualified weld current may include:
  generating a first resistance curve based on the continuously varying resistances; and
  determining the quality of the weld based on the trend of varying in the first resistance curve.

Optionally, determining whether a welding defect exists at the weld based on the trend of the variation of the resistance or on the comparison of the resistance with a resistance of the qualified weld current may include:
  conducting statistics about the qualified initial value, qualified intermediate value and qualified end value among the continuously varying resistances at a qualified weld to obtain a variation range of resistance of the qualified initial value, the qualified intermediate value and the qualified end value based on the statistical results; and
  determining the quality of the weld according to the comparison of the initial, intermediate and end values of the continuously varying resistances at the weld to be detected with the variation range of the resistance.

Optionally, applying a voltage to the weld for a period from stopping the welding current till the temperature of the weld reaches a predetermined threshold may include:

applying voltage to the weld through the poles of the welding gun.

The present application also provides a device for welding quality detection including:

a voltage module for applying a detection voltage to a weld for a period from cut-off of the welding current till the temperature at the weld reaches a predetermined threshold;

a detection module for obtaining a detection current generated by a detection voltage applied at the weld;

a calculation module for calculating a resistance of the weld continuously varying in the cooling phase according to the detection voltage and the detection current; and a determination module for determining whether there is a welding defect in the weld according to the trend of variation of the resistance or the comparison of the resistance with a resistance of the qualified weld.

The present application also provides an apparatus for welding quality detection comprising:

a non-volatile memory storing a computer-executable program for implementing the method of weld quality detection described above; and a processor retrieving a computer executable program to perform: applying a detection voltage to the weld for a period from the cut-off of the welding current till the temperature of the weld reaches a predetermined threshold; obtaining a detection current generated by the detection voltage applied to the weld; calculating a resistance of the weld continuously varying during the cooling phase based on the detection voltage and the detection current; and determining whether a welding defect exists at the weld based on the trend of the variation of the resistance or on the comparison of the resistance with a resistance of the qualified weld current.

The present application also provides a storage medium storing a computer executable program to be retrieved by a processor to perform the steps of the above-described method of welding quality detection.

The present application provides a method for weld quality detection applied to a welding device, wherein an operation process of the welding device includes a welding phase and a cooling phase after stopping welding current, the method including: applying a detection voltage to the weld for a period from the cut-off of the welding current till the temperature of the weld reaches a predetermined threshold; obtaining a detection current generated by the detection voltage applied to the weld; calculating a resistance of the weld continuously varying during the cooling phase based on the detection voltage and the detection current; and determining whether a welding defect exists at the weld based on the trend of the variation of the resistance or on the comparison of the resistance with a resistance of the qualified weld current.

The application indirectly characterizes the heat stored in a weld nugget by measuring and analyzing the resistance variation during the cooling process of the weld nugget and using the relationship between the resistivity and the temperature of the metal material, thereby realizing the detection and evaluation of the quality of resistance spot welding.

DETAILED DESCRIPTION

Figure 1:
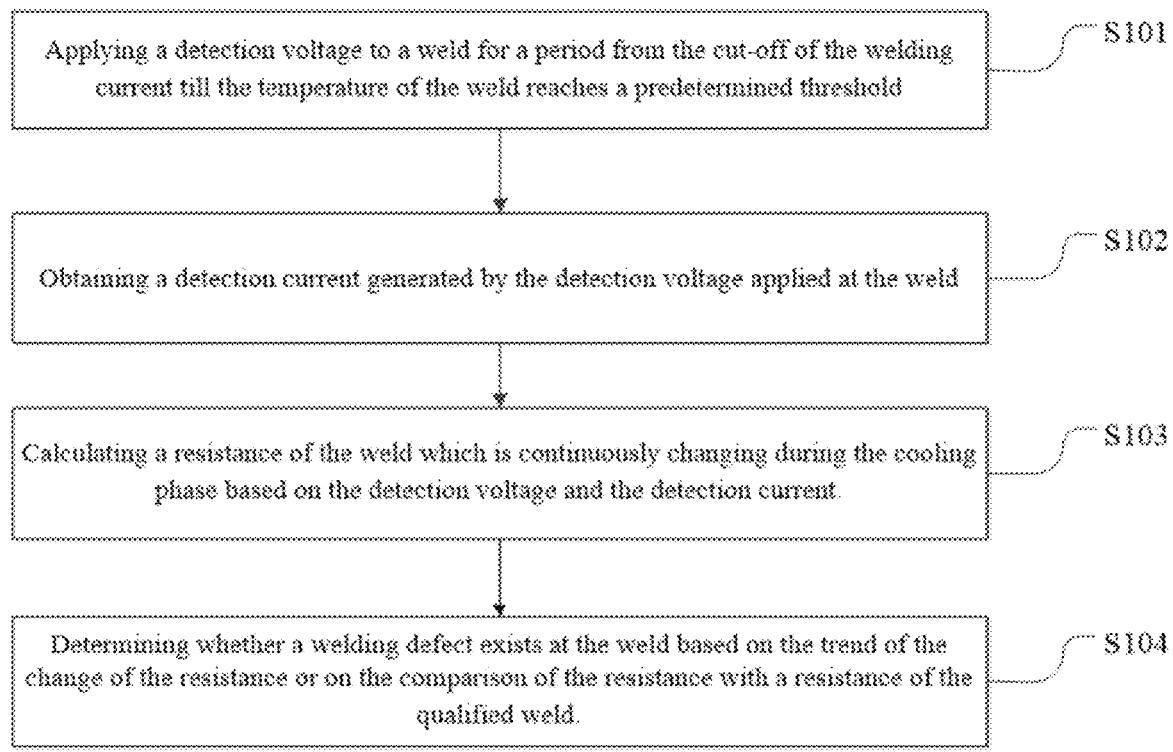
FIG. 1 is a schematic diagram of the process of detecting welding defects according to an embodiment of the present application.

Exemplary embodiments of the present disclosure will be described in greater detail below with reference to the accompanying drawings. It should be understood that the present disclosure may be realized in various forms without being limited by the embodiments. These embodiments are provided to facilitate the skilled in the art to more thoroughly understand the present disclosure.

This application belongs to the field of resistance welding quality detection, and the technical problem to be solved is how to quickly and easily detect the welding quality.

Resistance welding is a widely used welding technique, the basic principle of which is to make connections between workpieces by applying a voltage on the electrodes therebetween and using the resistance heat generated when the current passes through the workpieces to melt the contact surfaces of the workpieces. The key to this welding method is the generation and control of heat, which is determined jointly by the current, resistance and welding time.

Welding heat generation is represented by the equation $Q=I^2 Rt$. Where Q is the heat generated, I is the welding current, R is the inter-electrode resistance and t is the welding time. The inter-electrode resistance is mainly composed of the resistance of the workpiece itself, the contact resistance between the workpieces and the contact resistance between the electrode and the workpiece. The welding current and welding time can be preset according to the welding process to achieve the desired welding result.

The resistivity of a workpiece is one of its important physical properties, which determines the amount of resistance that the workpiece produces when an electric current passes through it. Resistivity increases with the increase of temperature and decreases with the decrease of temperature. Inter-electrode resistance can reflect the contact state between the electrode and the workpiece, varies in the metallurgical process and physical properties during the welding process, which can indirectly characterize the quality of the weld joint.

The resistance spot welding process is divided into two phases: a welding phase in which a pressure is generated by applying a force while power is on for welding, and a cooling phase in which the power is cut off and the pressure is maintained.

In the welding stage, the workpiece is melted by resistive heat, forming a weld nugget that grows.

In the cooling stage, the weld nugget is cooled and solidified under pressure to form a stable weld joint. The size of the nucleus has a direct impact on the quality of the weld joint, that is, too large a weld nugget is prone to spattering defects, while too small a weld nugget may result in an insufficient weld joint.

Resistance spot welding cooling process is a process in which liquid metal weld nugget crystallizes, solidifies and continuously cools to room temperature under pressure. This process is accompanied by phase changes and plastic deformation, and the cooling rate is closely related to the temperature and volume of the weld nugget. The heat absorbed by the weld nugget and the heat dissipation conditions affect the cooling process. When the temperature of the weld nugget is high and the volume is large, more heat is stored and the cooling rate is slow; conversely, when the temperature of the weld nugget is low and the volume is small, the cooling rate is fast.

If the temperature of a weld nugget is too high and the volume of the core is too large, spatter defects are likely to occur, resulting in a large loss of heat stored in the core, the cooling speed in the cooling process becomes faster. On the contrary, if the core temperature is too low, the volume is too small, then the heat stored in the core is low, and the cooling speed in the cooling process is faster than that of a normal weld joint, virtual welding defects will be liable to occur. When the core is cooling to room temperature, the temperature no longer changes, and the resistance tends to stabilize.

Since the cooling characteristic of resistance welding is closely related to the heat stored in the weld nugget, which in turn is related to the temperature and volume of the weld nugget, the cooling characteristics of spot welding can indirectly reflect the quality of weld joints. By observing and analyzing the characteristics of the cooling process, the quality of the weld joints can be evaluated, providing a basis for the optimization of the welding process and quality control.

Based on the above principles, the present application proposes a method, apparatus, device and storage medium for welding quality detection.

Referring to FIG. 1, a method of evaluating welding defects, comprising:

S101: Applying a detection voltage to a weld for a period from the cut-off of the welding current till the temperature of the weld reaches a predetermined threshold.

S102: Obtaining a detection current generated by the detection voltage applied at the weld.

S103: calculating a resistance of the weld which is continuously varying during the cooling phase based on the detection voltage and the detection current.

S104: Determining whether a welding defect exists at the weld based on the trend of the variation of the resistance or on the comparison of the resistance with a resistance of the qualified weld.

Figure 2:
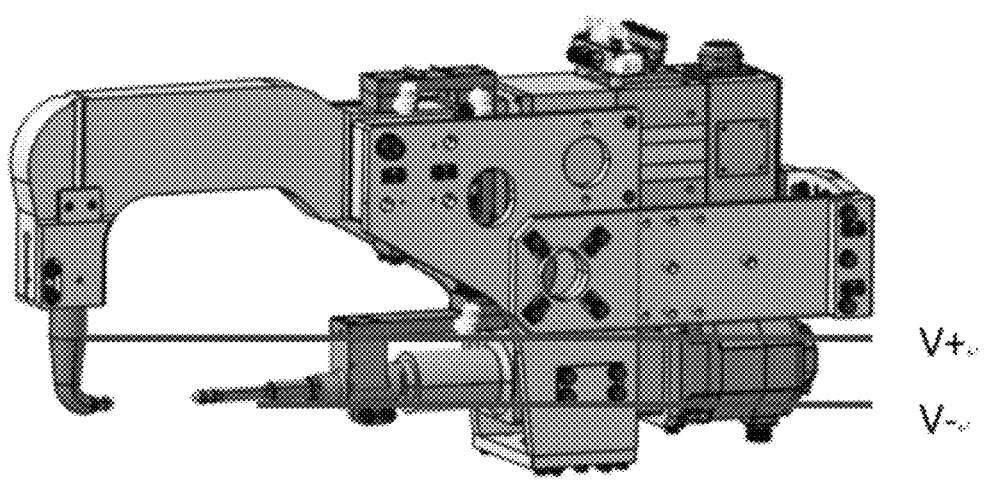
FIG. 2 is a schematic diagram of the installation location of the voltage detection line according to an embodiment of the present application.

In step S101, as shown in FIG. 2, changes of the voltage between the electrodes are detected in real time with a voltage detection line at both ends of the electrodes of the welding device.

In step S102, a current detection line and a device thereof are installed at a suitable location in the secondary circuit to detect changes in current.

In step S103, during the power-off and pressure maintaining period (cooling phase) of the resistance spot welding, the weld nugget serves as the main heat source, and its heat is dissipated to the electrode, the workpiece, and the surrounding air. Since the resistivity of the electrode and the weld nugget is closely related to the temperature, as the temperature decreases, the resistivity decreases accordingly. Therefore, by detecting the resistance variation of the electrode and the weld nugget, the temperature change during the cooling phase of the weld nugget can be indirectly reflected, thus realizing the determination of the quality of the weld joint.

During the power-off and pressure maintaining period of resistance spot welding, smaller voltages and currents are applied through the test line, in which the current is much smaller than the current used in welding (thousands to tens of thousands of amperes) and therefore do not significantly affect the crystal structure and mechanical properties of the weld nugget.

The measured voltage and current values are recorded during the power-off and pressure maintaining period. The voltage and current values can be recorded at fixed time intervals (e.g., milliseconds) or intermittently (e.g., at key moments such as initial, intermediate, and end).

According to Ohm's law ($R=V/I$), the resistance was obtained by calculation using the recorded voltage and current values.

In step S104, characteristics of the resistance curve are analyzed, including variations in the initial, intermediate, and end values of the resistance, to determine the quality of the weld.

During the cooling phase of the weld, the initial value of the weld joint at least at the beginning of the weld, the intermediate value during the weld, and the end value at the end of the welding are recorded.

The recorded resistances are compared with the resistances of known qualified weld joints at the same moment to find difference therebetween.

If the difference (deviation) exceeds the permissible deviation range for a normal weld joint, then the joint can be judged as failing.

In addition to simple numerical comparisons, a curve of resistances over time (called the first curve) is generated based on the initial, intermediate and end values of resistances recorded during the cooling phase of the weld.

The generated first curve is compared with a preset curve of the resistance at the qualified weld as a function of time (called the second curve).

The second curve is based on extensive experimental data and experience and represents the trend of resistances during an ideal or qualified welding process.

By comparing the two curves, it is possible to determine whether the weld quality is satisfactory.

In addition to directly comparing the curves, the variation trend of the first curve is also analyzed. The variation trend can be expressed by the slope of the curve, and the change in slope can reflect the speed and stability of the variation in resistance.

If the slope of the first curve remains stable during the welding process, or changes in an expected manner, then this may indicate that the weld quality is qualified. Conversely, if the slope varies abnormally or erratically, this may indicate a problem with the quality of the weld.

Figure 3:
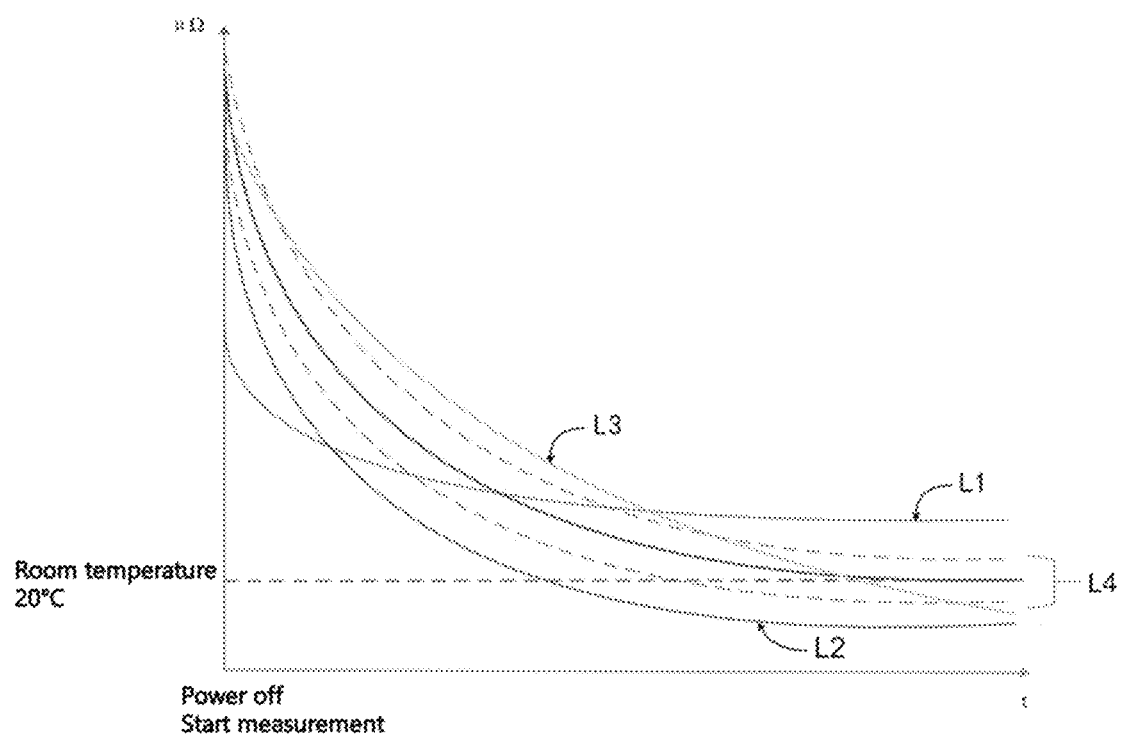
FIG. 3 is a schematic diagram showing comparison of the weld quality problem curves according to an embodiment of the present application.

FIG. 3 shows the determination of quality issues.

Insufficient weld joint (L1): Insufficient weld joint has a low melting core temperature, small volume, holds little heat, and has a small melting area, thus leading to this characteristic of the resistance curve L1.

Therefore, if the initial value is less than the initial value at the qualified weld, the intermediate value decreases at a rate smaller than the rate of decrease of the intermediate value at the qualified weld, the end value is greater than the end value at the qualified weld, and the difference between the initial value and the end value is less than a first predetermined threshold, then the weld is determined to be a false weld.

Spatter (L2): If spattering occurs, the resistance curve will show a rapid decrease as the spatter metal takes heat away from the weld nugget and causes a reduction in metal in the core area. The resistance at the end of the spatter will be less than that of a normal joint.

Therefore, if the difference between the initial value and the initial value at the qualified weld is less than the second predetermined threshold, the rate of decline of the intermediate value is greater than the rate of decline of the intermediate value at the qualified weld, the end value is less than the end value at the qualified weld, and the difference between the initial value and the end value is less than the third threshold, then it is determined a spattering occurs.

The first threshold, the second threshold and the third threshold are parameters that can be set for different materials and environments according to the actual situation, and therefore are not limited to specific values.

Still referring to FIG. 3, the analysis of other scenarios includes: Weld nugget is too large (L3): The beginning resistance is comparable with the qualified joints, the cooling speed is slow, slowly reaching room temperature, the end resistance is smaller than the resistance of qualified joints, and the difference between the initial and end resistances is large.

Weld nugget is too small: Similar to the above curve for insufficient weld joint.

In short, if the resistance at the corresponding time during the cooling process exceeds the tolerance band range L4, it is judged an unqualified weld joint, and which unqualified type the weld joint belong to should be analyzed specifically. If the resistance at the corresponding time during the cooling process is within the tolerance band range L4, it is judged a qualified weld joint.

In an embodiment, the voltage and current measurements are obtained at the initial, intermediate, and end time points to obtain the resistances through calculation, which complies the following steps.
  (1) The measured value (R1) is obtained as soon as the welding current is cut off and the test current is on.
  (2) At the intermediate value of time (T2) during the power-off and pressure maintaining period, a measured value (R2) is obtained.
  (3) A measured value (R3) is obtained when the resistance variation is basically stabilized (T3), i.e., at the end moment of the power-off and pressure maintaining period.

Further, a plurality of measurements (R) may be obtained at a fixed time intervals (e.g., 1 ms), and a first curve of resistance over time may thus be plotted.

Statistical calculation is conducted for the measured values of qualified weld joints obtained under the same welding process and conditions. Based on the statistical results, the variation range of the resistance at the corresponding moments in the cooling phase of the qualified joints is determined.

The resistance obtained during the cooling phase of the weld joint to be tested is compared with the resistance of the qualified weld joint at the corresponding moment of the cooling phase under the same welding process and conditions.

If the resistance of the weld joint to be tested is within the variation range as indicated by L4 of FIG. 3, it is judged to be a qualified weld joint; otherwise, it is judged to be an unqualified weld joint.

In-depth analysis of records or curve characteristics of weld joints judged to be unqualified is performed to further determine whether the unqualified weld joints have false welds, spatters, or other welding defects.

The present application realizes quality determination by using the cooling characteristics of the weld joint, namely to characterize the temperature variation during the cooling phase of the weld nugget by measuring the resistance and comparing it with the resistance of the normal weld joint cooling phase. The technology is capable of detecting all weld joints in real time on the production line, ensuring full coverage and leaving no dead ends. The detection process is quick and easy to automate without human intervention, and fits perfectly with the production rhythm on site without causing production delays.

This application conducts the quality detection in the cooling phase, which is subject to fewer external influencing factors, and the heat dissipation process is stable, which can effectively reflect the heat stored in the welded weld nugget during the welding process. By measuring the resistance to characterize the temperature variation during the cooling phase of the weld nugget and comparing it with the resistances in the cooling phase of the normal weld joints, it realizes the quality determination without adding additional sensors, effectively reduces the additional cost and saves the investment. This application can be effectively used for AC and DC welding and has a wide range of applications.

Moreover, the method of the present application supports a wide range of metallic materials and has strong material compatibility.

The present application also provides a device for welding quality detection comprising:
  a voltage module for continuously applying a detection voltage to a weld during the cooling phase after the metal material has been welded and the welding current is cut off;
  a detection module for detecting a detection current corresponding to the detection voltage;
  a calculation module for calculating continuously varying resistances at the weld based on the detection voltage and the detection current; and
  a determination module for determining a welding quality based on an initial value, an intermediate value, and an end value of the resistances.

The present application also provides an apparatus for welding quality detection comprising:
  a non-volatile memory storing a computer-executable program for implementing the method for weld quality detection described above; and
  a processor retrieving the computer executable program to perform: continuously applying a detection voltage to a weld during the cooling phase after the metal material has been welded and the welding current is cut off; obtaining a detection current corresponding to the detection voltage; calculating continuous values of resistance of the weld during the cooling phase based on the detection voltage and the detection current; and determining whether a welding defect exists at the weld based on the initial, intermediate, and end values of the resistance.

The present application also provides a storage medium storing a computer-executable program for being called by a processor to perform the steps of the above-described method for welding defect detection.

The invention claimed is:

1. A method for welding quality detection, applied on a welding device, said welding device having an operating process comprising a welding phase and a cooling phase after stopping welding current, the method comprising:

applying a detection voltage to a weld for a period from the cut-off of the welding current until a temperature of the weld reaches a predetermined threshold;

obtaining a detection current generated by the detection voltage applied to the weld;

calculating resistances of the weld continuously varying during the cooling phase based on the detection voltage and the detection current; and determining whether a welding defect exists at the weld based on a trend of the variation of the resistances or on a comparison of the resistances with resistances of the qualified weld, comprising:

determining there is an insufficient weld joint if, an initial value of the resistances of the weld is smaller than an initial value of the resistances of the qualified weld, a rate of decline of an intermediate value of the resistances of the weld is smaller than the rate of decline of the intermediate value of the resistances of the qualified weld, an end value of the resistances of the weld is larger than the end value of the resistances of the qualified weld, and a difference between the initial value of the resistances of the weld and the end value of the resistances of the weld is smaller than a first threshold.

2. The method according to claim 1, wherein determining whether a welding defect exists at the weld based on the trend of the variation of the resistances or on the comparison of the resistances of the weld with the resistances of the qualified weld current comprises:

generating a first resistance curve based on the continuously varying resistances of the weld;

obtaining a second resistance curve generated based on the continuously varying resistances of the qualified weld at the cooling stage; and comparing the first resistance curve with the second resistance curve to determine if there is a welding defect.

3. The method according to claim 1, wherein determining whether a welding defect exists at the weld based on the trend of the variation of the resistances or on the comparison of the resistances of the weld with the resistances of the qualified weld current comprises:

determining there is a spatter if, difference between the initial value of the resistances of the weld and the initial value of the resistances of the qualified weld is less than a second threshold, the rate of decline of the intermediate value of the resistances of the weld is greater than the rate of decline of the intermediate value of the resistances of the qualified weld, the end value of the resistances of the weld is less than the end value of the resistances of the qualified weld, and the difference between the initial value of the resistances of the weld and the end value of the resistances of the weld is less than a third threshold.

4. The method according to claim 1, wherein determining whether a welding defect exists at the weld based on the trend of the variation of the resistances or on the comparison of the resistances of the weld with the resistance of the qualified weld current comprises:

generating a first resistance curve based on the continuously varying resistances; and determining a quality of the weld based on a trend of varying in the first resistance curve.

5. The method according to claim 1, wherein determining whether a welding defect exists at the weld based on the trend of the variation of the resistances or on the comparison of the resistances of the weld with the resistances of the qualified weld current comprises:

conducting statistics about a qualified initial value, qualified intermediate value and qualified end value among the continuously varying resistances of the qualified weld to obtain a variation range of resistances of the qualified initial value, qualified intermediate value and qualified end value based on the statistical results; and determining a quality of the weld according to the comparison of the initial, intermediate and end values of the resistances of the weld to be detected with the variation range of the resistances.

6. The method according to claim 1, wherein applying the detection voltage to the weld for a period from the cut-off of the welding current until the temperature of the weld reaches a predetermined threshold comprises:

applying the detection voltage to the weld through the poles of the welding gun.

7. A non-transitory computer readable storage medium storing a computer-executable program therein, wherein the computer-executable program, when executed by a processor, performs the steps of the method for weld quality detection according to claim 1.

* * * * *